(12) United States Patent
Berkman

(10) Patent No.: US 7,769,149 B2
(45) Date of Patent: Aug. 3, 2010

(54) AUTOMATED UTILITY DATA SERVICES SYSTEM AND METHOD

(75) Inventor: William H. Berkman, New York, NY (US)

(73) Assignee: Current Communications Services, LLC, Rochester, NY (US)

( * ) Notice: Subject to any disclaimer, the term of this patent is extended or adjusted under 35 U.S.C. 154(b) by 1043 days.

(21) Appl. No.: 11/327,340

(22) Filed: Jan. 9, 2006

(65) Prior Publication Data

US 2007/0165835 A1 Jul. 19, 2007

(51) Int. Cl.
*H04M 11/00* (2006.01)

(52) U.S. Cl. .............................. 379/93.01; 340/310.01

(58) Field of Classification Search ............ 340/310.01, 340/870.02; 370/217; 702/61–62; 380/234; 379/93

See application file for complete search history.

(56) References Cited

U.S. PATENT DOCUMENTS

| | | | |
|---|---|---|---|
| 3,445,814 A | 5/1969 | Spalti | |
| 3,656,112 A | 4/1972 | Paull | |
| 3,900,842 A | 8/1975 | Calabro et al. | |
| 3,942,168 A | 3/1976 | Whyte | |
| 3,967,264 A | 6/1976 | Whyte et al. | |
| 3,973,087 A | 8/1976 | Fong | |
| 3,973,240 A | 8/1976 | Fong | |
| 4,119,948 A | 10/1978 | Ward et al. | |
| 4,442,492 A | 4/1984 | Karlsson et al. | |
| 4,652,855 A | 3/1987 | Weikel | |
| 5,056,107 A | 10/1991 | Johnson et al. | |
| 5,426,360 A | 6/1995 | Maraio et al. | |
| 5,448,229 A | 9/1995 | Lee, Jr. | |
| 5,559,870 A * | 9/1996 | Patton et al. | 379/106.03 |
| 5,572,438 A | 11/1996 | Ehlers et al. | |
| 5,696,501 A | 12/1997 | Ouellette et al. | |
| 5,748,104 A | 5/1998 | Argyroudis et al. | |
| 5,801,643 A | 9/1998 | Williams et al. | |
| 5,805,458 A | 9/1998 | McNamara et al. | |
| 5,880,677 A | 3/1999 | Lestician | |

(Continued)

FOREIGN PATENT DOCUMENTS

EP 0 581 351 A1 2/1994

OTHER PUBLICATIONS

"Archnet: Automatic Meter Reading System Power Line Carrier Communication", www.archnetco.com/english/product/product_sl.htm, (2001).

(Continued)

*Primary Examiner*—Curtis Kuntz
*Assistant Examiner*—Maria El-Zoobi
(74) *Attorney, Agent, or Firm*—Mel Barnes; Capital Legal Group, LLC

(57) ABSTRACT

An automated utility data service system for communicating over a telecommunication medium that also communicates user data is provided. One embodiment includes a first transceiver coupled to a telecommunication medium and configured to receive user data in a customer premises via the telecommunication medium, and a modem communicatively coupled to a sensor configured to provide utility data. The first said first modem is communicatively coupled to the telecommunication medium, directly or indirectly to transmit the utility data over the telecommunication medium. The telecommunication medium may be a cable television coaxial cable, a fiber optic broadband internet cable, or a digital subscriber line twisted pair.

35 Claims, 4 Drawing Sheets

U.S. PATENT DOCUMENTS

| | | | |
|---|---|---|---|
| 5,892,758 | A | 4/1999 | Argyroudis |
| 6,150,955 | A | 11/2000 | Tracy et al. |
| 6,151,330 | A | 11/2000 | Liberman |
| 6,239,722 | B1 | 5/2001 | Colton et al. |
| 6,246,677 | B1 | 6/2001 | Nap et al. |
| 6,255,805 | B1 | 7/2001 | Papalia et al. |
| 6,262,672 | B1 | 7/2001 | Brooksby et al. |
| 6,346,875 | B1 | 2/2002 | Puckette et al. |
| 6,373,399 | B1 | 4/2002 | Johnson et al. |
| 6,459,998 | B1 | 10/2002 | Hoffman |
| 6,504,357 | B1 | 1/2003 | Hemminger et al. |
| 6,538,577 | B1 | 3/2003 | Ehrke et al. |
| 6,611,134 | B2 | 8/2003 | Chung |
| 6,618,709 | B1 | 9/2003 | Sneeringer |
| 6,650,249 | B2 | 11/2003 | Meyer et al. |
| 6,657,552 | B2 * | 12/2003 | Belski et al. ............ 340/870.02 |
| 6,684,245 | B1 | 1/2004 | Shuey et al. |
| 6,710,721 | B1 | 3/2004 | Holowick |
| 6,737,984 | B1 | 5/2004 | Welles et al. |
| 6,778,099 | B1 | 8/2004 | Meyer et al. |
| 6,954,814 | B1 | 10/2005 | Leach |
| 7,089,089 | B2 | 8/2006 | Cumming et al. |
| 7,181,010 | B2 * | 2/2007 | Russ et al. ................. 380/234 |
| 7,248,158 | B2 | 7/2007 | Berkman et al. |
| 7,274,305 | B1 | 9/2007 | Luttrell |
| 2001/0010032 | A1 | 7/2001 | Ehlers et al. |
| 2001/0038343 | A1 | 11/2001 | Meyer et al. |
| 2002/0019712 | A1 * | 2/2002 | Petite et al. ................... 702/61 |
| 2002/0063635 | A1 | 5/2002 | Shincovich |
| 2002/0084914 | A1 | 7/2002 | Jackson et al. |
| 2002/0101817 | A1 * | 8/2002 | Teixeira ...................... 370/217 |
| 2003/0063723 | A1 | 4/2003 | Booth et al. |
| 2003/0158677 | A1 | 8/2003 | Swarztrauber et al. |
| 2004/0064276 | A1 | 4/2004 | Villicana et al. |
| 2004/0083066 | A1 | 4/2004 | Hayes et al. |
| 2004/0113757 | A1 * | 6/2004 | White et al. ........... 340/310.01 |
| 2004/0239522 | A1 | 12/2004 | Gallagher |
| 2005/0033534 | A1 | 2/2005 | Villicaana et al. |
| 2005/0055432 | A1 | 3/2005 | Rodgers |
| 2005/0083206 | A1 | 4/2005 | Couch et al. |
| 2005/0090995 | A1 | 4/2005 | Sonderegger |
| 2005/0273282 | A1 | 12/2005 | Mollenkopf |
| 2006/0004679 | A1 | 1/2006 | Cahill-O'Brien et al. |
| 2006/0007016 | A1 | 1/2006 | Borkowski et al. |
| 2006/0031180 | A1 * | 2/2006 | Tamarkin et al. ............ 705/412 |
| 2006/0034480 | A1 * | 2/2006 | Simidian et al. ............ 381/396 |
| 2006/0036795 | A1 | 2/2006 | Leach |
| 2006/0045105 | A1 | 3/2006 | Dobosz et al. |
| 2006/0066456 | A1 | 3/2006 | Jonker et al. |
| 2006/0071810 | A1 | 4/2006 | Scoggins et al. |
| 2006/0085147 | A1 * | 4/2006 | Cornwall et al. .............. 702/62 |
| 2006/0091877 | A1 | 5/2006 | Robinson et al. |
| 2006/0106554 | A1 | 5/2006 | Borkowski et al. |
| 2006/0145834 | A1 | 7/2006 | Berkman et al. |
| 2006/0184288 | A1 | 8/2006 | Rodgers |
| 2007/0165835 | A1 | 7/2007 | Berkman |
| 2007/0236340 | A1 | 10/2007 | White |
| 2007/0287406 | A1 | 12/2007 | Kline |
| 2008/0018491 | A1 | 1/2008 | Berkman et al. |
| 2008/0037784 | A1 | 2/2008 | Corcoran et al. |

OTHER PUBLICATIONS

"EMETCON Automated Distribution System", *ABB Power T & D Company, Inc*, (Jan. 1990),1-14.

"Outlook Conference 2004: Amperion Deployment Overview", *Primen Conference*, (May 7, 2004),1-10.

Lokken, G , et al., "The Proposed Wisconsin Eectric Power Company Load Management System Using Power Line Carrier Over Distribution Lines", 1976 *National Telecommunications Conference, IEEE*, (1976),2.2-1 2.2-3.

Russell, B D., "Communication Alternatives for Distribution Metering and Load Management", *IEEE Transactions on Power Apparatus and Systems*, (1980),1448-1455.

* cited by examiner

AUTOMATED UTILITY DATA SERVICES SYSTEM AND METHOD

FIELD OF THE INVENTION

The present invention generally relates to utility data services, and more particularly to an automated system and method for monitoring utility service delivery and consumption.

BACKGROUND OF THE INVENTION

Commercial and residential building structures typically receive utility services, such as electricity, water, and gas. The cost of each utility service usually is based on consumption. For example, the more electricity consumed, the greater the customer's bill for the electric service. To monitor consumption a utility meter may be maintained. The power company maintains a power meter for monitoring electricity. The water company maintains a water meter. When gas lines deliver gas to premises, a gas meter is maintained. Typically, utility meter reader personnel periodically inspect the utility meters to get an accurate indication of utility service consumption. The collected data has been used for customer billing purposes as well as for monitoring customer demand. In addition, utilities, such as electric utilities, may use personnel to manually take measurements to assess the quality of the service provided and efficiency of the distribution system. Such measurements may include primary line current, power delivered to a transformer, power factor, power delivered to a downstream branch, harmonic components of a power signal, load transients, load distribution, and/or others.

Utility companies desire automated methods of monitoring customer demand and consumption. In addition, utilities such as electric utilities desire to automate the assessment of the quality of the service provided. These and other advantages may be provided by one or more embodiments of the present invention.

SUMMARY OF THE INVENTION

The present invention provides an automated utility data service system which communicates over a telecommunication medium. One embodiment includes a first transceiver coupled to a telecommunication medium and configured to receive user data in a customer premises via the telecommunication medium, and a modem communicatively coupled to a sensor configured to provide utility data. The first said first modem is communicatively coupled to the telecommunication medium, directly or indirectly to transmit the utility data over the telecommunication medium.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE ILLUSTRATIVE EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Figure 1:
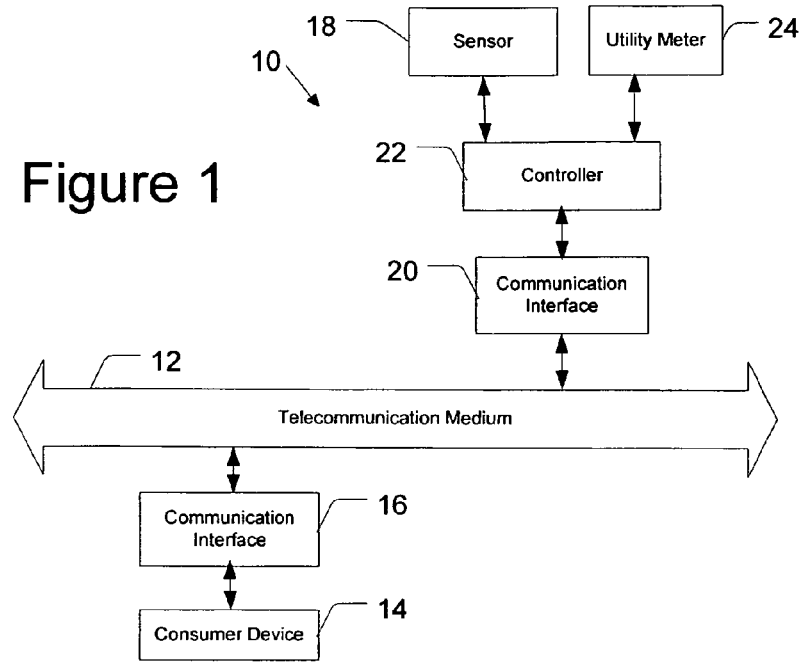
FIG. 1 is a block diagram of an example embodiment of an automated utility data service system according to the present invention.

FIG. 1 shows an example embodiment of an automated utility data service system 10 which communicates via a telecommunication medium 12. For example, the telecommunication medium 12 may be coupled to a residence or other structure to provide telephone service, cable television, internet service or a variation of such services along a fiber optic cable, coaxial cable, or twisted pair. A user device 14 may access the telecommunication medium 12 directly or through a communication interface 16. For example, user devices 14 such as a television or VCR may access a cable medium directly or through a cable box. User devices 14, such as a computer or router may access the telecommunication medium through an appropriate modem. User devices such as a telephone or fax machine may access the telecommunication medium directly, when the medium is an embodiment of the public switched telephone network. The telecommunication medium may carry user data such as analog or digital television and/or audio signals, internet data (including broadband internet data, Voice over Internet Protocol (VOIP) data, streaming video, streaming audio, email, instant messaging, etc.), public switched telephone network communications (e.g., analog voice, fax, dial-up modem, and/or other communications), and/or other data.

According to some embodiments described here, utility data also may be communicated along such telecommunication media (fiber optic, coaxial cable, or twisted pair). Downstream user data destined for the user device 14 may be communicated along the telecommunication medium 12 at one frequency band, while downstream utility-related commands or upstream utility data may be sent along the telecommunication medium at a second frequency band, which differs from the first frequency band. In another embodiment, the upstream and downstream data may be communicated via an Internet Protocol (IP) data packets that include an destination address so that only the destination device processes the data packets.

In this example embodiment, utility data may be supplied by a sensor 18, provided to a controller 22 transmitted via a communication interface 20 onto the telecommunication medium 12. In some embodiments the sensor 18 directly measures a utility parameter to provide the utility data. For example, the sensed utility data may include power usage data, water usage data, gas usage data, power line voltage data, power line current data, detection of a power outage, detection of water in a pad mount, detection of an open pad mount, detection of a street light failure, primary line current data, power delivered to a transformer data, power factor data, power delivered to a downstream branch data, harmonic components of a power signal data, load transients data, and/or load distribution data. One skilled in the art will appreciate that other types of utility data also may be gathered. In some embodiments utility data instead, or additionally, may be received from a utility meter 24 (gas, water and/or electric power), which may include a sensor for measuring utility parameters. Thus, in various embodiments the utility meter 24 may be a power meter, gas meter or water meter. Additionally, the sensor 18 may be formed of a sensing device and other components (such as an analog to digital converter) that provide meaningful information to the controller 22.

In some embodiments, commands or other communications (such as requests for transmission of utility data or to modify a transmission schedule) may be transmitted along the telecommunication medium and received at the controller 22 through the communication interface 20. Various networks protocols may be used to communicate over the telecommunication medium 12, such as an IP network protocol, an Ethernet protocol, a DSL network protocol, a data over cable service interface specification (DOCSIS) protocol, or another network protocol. The communication interfaces 16, 20 may vary according to the telecommunication medium embodiment and network protocol. For example, in various embodiments the communication interfaces 16, 20 may include a cable modem (such as, for example purposes only, a DOCSIS compatible modem or DOCSIS certified modem), digital subscriber line (DSL) modem, fiber optic transceiver or other transceiver. As will be evident to those skilled in the art from the description below, controller 22, sensor 18, utility meter 24, and communication interface 20 may be disposed external to the customer premises such as at a distribution transformer and/or mounted to a utility pole.

Figure 2:
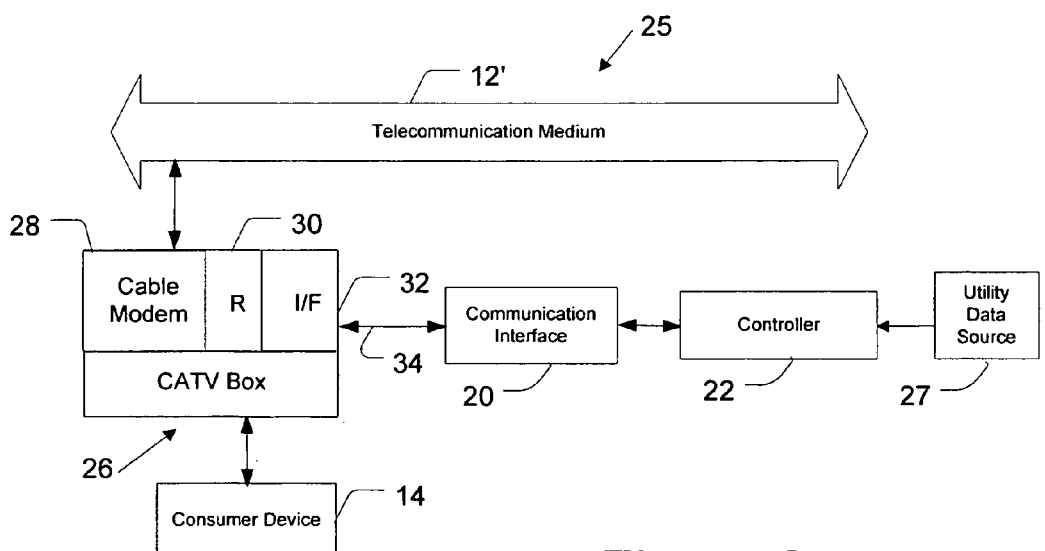
FIG. 2 is a block diagram of another example embodiment of an automated utility data service system according to the present invention.

Although the utility data may be directly coupled onto the telecommunication medium 12 through the communication interface 20 as shown in FIG. 1, in other embodiments the utility data may be coupled indirectly onto the telecommunication medium 12 through another communication link. FIG. 2 shows an embodiment of an automated utility data service system 25 in which the utility data is coupled to a coaxial cable embodiment 12' of the telecommunication medium indirectly through a cable set top box 26. The cable box 26 may include a cable modem 28, data interface 32, and components found in a conventional digital cable set top box 26 and may include a router 30.

A utility data source 27 provides utility data, and may include a sensor 18, a utility meter 24 or both a sensor and a utility meter. The utility data is transmitted from the controller 22 and communication interface 20 along a communication link 34 to the data interface 32 at the cable box 26. The utility data may be routed by the router 30 from the data interface 32 to the cable modem 28 for transmission onto the telecommunication medium 12' immediately, or stored, routed, and transmitted some time after reception. Thus, this upstream data may be prioritized, routed, and transmitted over coaxial cable 12' along with upstream data traffic from the user (e.g., requests for video on demand). Similarly, downstream data is received from the telecommunication medium 12' at the cable modem 28, routed by router 30 through the data interface 32 over the link 34 to the communication interface 20 and controller 22. Downstream user data, such as digital cable television data may also be received at the cable modem 28 and routed by router 30 to the user device 14 (e.g., television). In this embodiment, the upstream utility data and user data may share the same frequency (e.g., as accorded by the applicable or implemented DOCSIS standard). Similarly, the downstream utility data and user data may share the same frequency (e.g., as accorded by the applicable or implemented DOCSIS standard). In an alternate embodiment, the user data to or from the user device 14 may be communicated along the telecommunication medium 12' at one frequency, while utility commands and data may be transmitted over the telecommunication medium 12' at a second frequency, which differs from the first frequency.

In various embodiments the link 34 between the utility communication interface 20 and cable box data interface 32 may be established using any suitable communication medium, such as a coaxial cable, twisted pair, infrared, fiber optic cable or other wired or wireless medium. Various networks protocols may be used to maintain the link 34, such as Ethernet, DSL, IEEE 802.11a, b, or g, or another network protocol. Thus, the communication interface 20 and data interface 32 may vary according to the communication medium and network protocol used to maintain the communication link 34. For example, in various embodiments the communication interface 20 and data interface 32 may include a cable modem, DSL modem, fiber optic transceiver, or other transceiver. This embodiment, and those described below, may be suitable for installations in which the telecommunications medium 12 is not physically present at the utility data source 27 and where installation to the location thereof is impractical, inconvenient, and/or expensive in comparison to the use of link 34 and its associated components.

Figure 3:
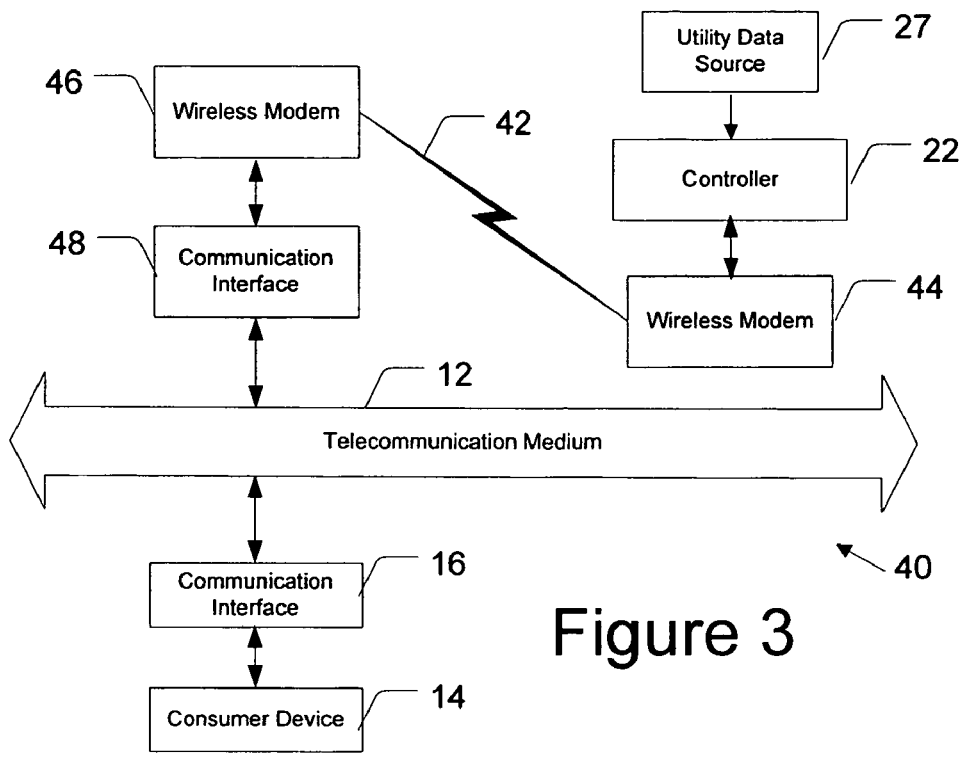
FIG. 3 is a block diagram of still another example embodiment of an automated utility data service system according to the present invention.

FIG. 3 shows another embodiment of an automated utility data service system 40, in which the controller 22 is coupled to the telecommunication medium 12 indirectly through a wireless link 42. Utility data is gathered by the utility data source 27 (e.g., a sensor 18, utility meter 24 or both). The utility data is wirelessly transmitted upstream by a wireless transceiver 44 under the direction of the controller 22 to an upstream wireless transceiver 46. The upstream transceiver 46 transmits the utility data onto the telecommunication medium 12 through a communication interface 48. Similarly downstream communications to controller 22 may be received via the telecommunication medium 12 at communication interface 48, and transmitted by transceiver 46 over the wireless link 42 to the wireless transceiver 44. The controller 22 receives the communications received at the transceiver 44.

The wireless links may use any suitable frequency band. In one example, frequency bands are used that are selected from among ranges of licensed frequency bands (e.g., 6 GHz, 11 GHz, 18 GHz, 23 GHz, 24 GHz, 28 GHz, or 38 GHz band) and unlicensed frequency bands (e.g., 900 MHz, 2.4 GHz, 5.8 Ghz, 24 GHz, 38 GHz, or 60 GHz (i.e., 57-64 GHz)). Any suitable protocol may be used including a conventional cordless telephone protocol or an IEEE 801.11a, b, or g protocol.

The communication interface 48 may vary according to the embodiment of the telecommunication medium 12 and a compatible network protocol. For example, in various embodiments the communication interface 48 may include a cable modem, DSL modem, fiber optic transceiver, or other transceiver. A user device 14 may access the telecommunication medium 12 directly or through the communication interface 16, as previously described with regard to FIG. 1. As discussed above, the data communications over the telecommunications medium 12 may be frequency division multiplexed or time division multiplexed and may be unicast (e.g., each modem connected to the medium 12 having a different address), multicast, or broadcast.

Figure 4:
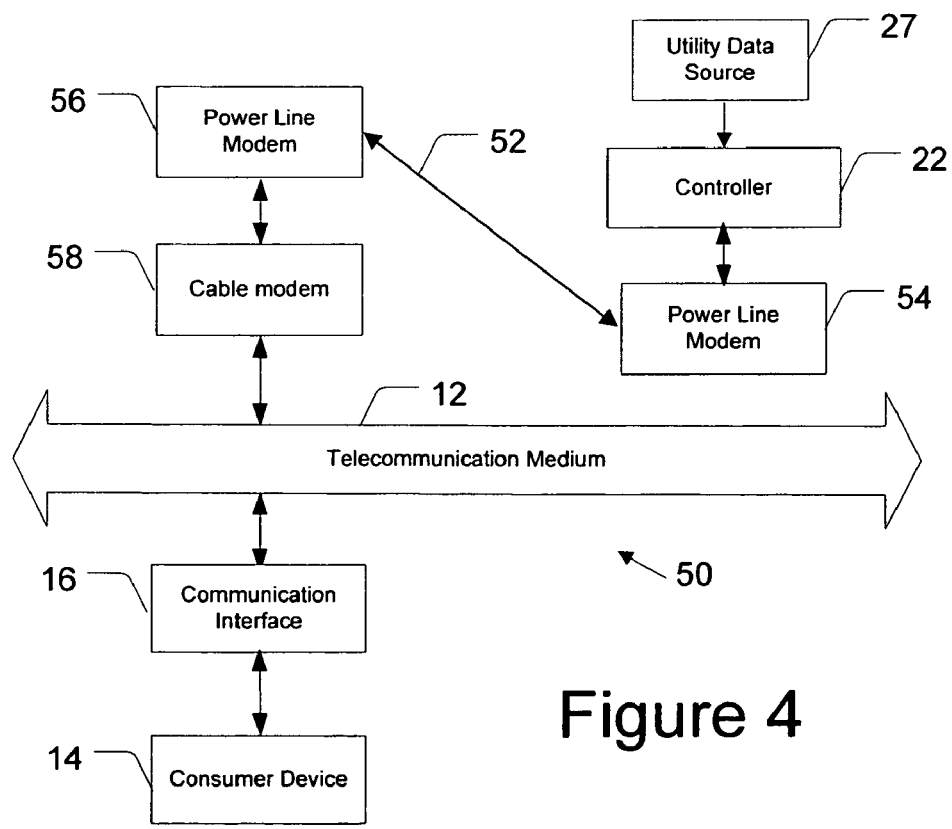
FIG. 4 is a block diagram of still another example embodiment of an automated utility data service system according to the present invention.

FIG. 4 shows another embodiment of an automated utility data service system 50, in which the controller 25 is coupled to the telecommunication medium 12 indirectly through a low voltage ('LV') power line 52. Utility data is gathered at the utility data source 27 (e.g., sensor 18, utility meter 24 or both). The utility data is transmitted by a power line modem 54 under the direction of the controller 22 to an upstream power line modem 56. The upstream power line modem 56 transmits the utility data onto the telecommunication medium 12 through a communication interface 58. Similarly downstream communications to controller 22 are received from the telecommunication medium 12 at communication interface 58, and transmitted by power line modem 56 over the LV power line 52 to the power line modem 54. The controller 22 receives the communications via the power line modem 54. One protocol for communicating between power line modems 54, 56, over the LV power line 52 is the HomePlug 1.0 or AV standard of the HomePlug® Alliance. In such an embodiment, the power line modems 54, 56 may be plugged into respective wall sockets at a customer premises. The controller 22 may be coupled to the power line modem 54 at or in the vicinity of the engaged wall socket. Similarly, the communication interface 58 may be coupled to the power line modem 56 at or in the vicinity of the other engaged wall socket.

The communication interface 58 may vary according to the embodiment of the telecommunication medium 12 and a compatible network protocol. For example, in various embodiments the communication interface 58 may include a cable modem, DSL modem, fiber optic transceiver, or other transceiver. A user device 14 may access the telecommunication medium 12 directly or through the communication interface 16, as previously described with regard to FIG. 1. As discussed above, the data communications over the telecommunications medium 12 may be frequency division multiplexed or time division multiplexed and/or may be unicast (e.g., each modem connected to the medium 12 having a different address), multicast, or broadcast.

Figure 5:
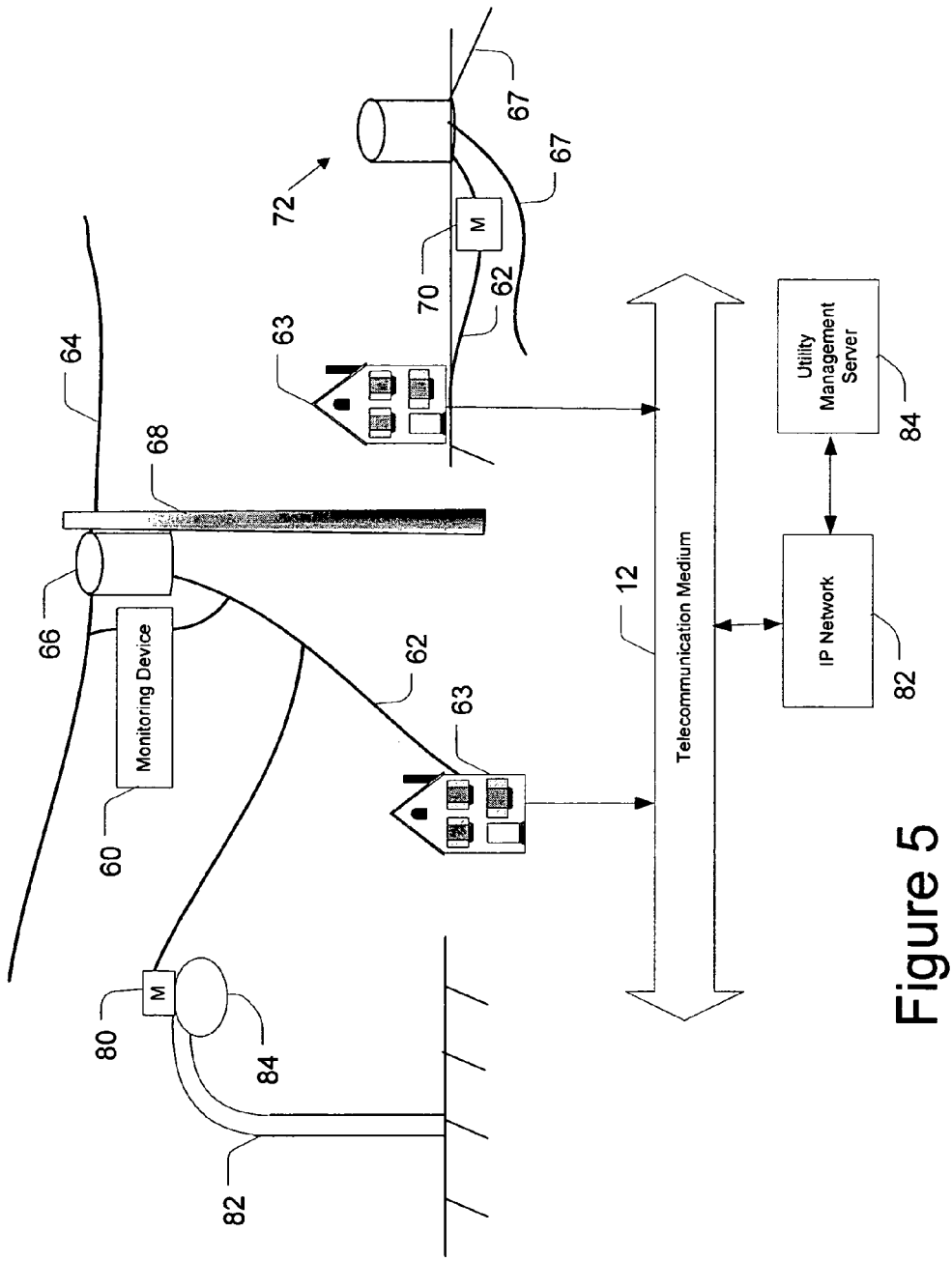
FIG. 5 is a diagram depicting an implementation of example embodiment of an automated utility data service system according to the present invention.

FIG. 5 shows an embodiment in which the utility data source 27, controller 22 and power line modem 54 of FIG. 4 are packaged as a monitoring device 60, 70, 80 and connected to an LV power lines 62 which extend to customer premises 63. The utility data source 27 may include a sensor 18 which measures utility parameters in the vicinity of the customer premises (such as at an LV power line 62), at an overhead MV power line 64, at an underground MV power line 67, at a power line transformer 66 and pole 68, at a street lamp 82, or pad mount transformer 72. In some embodiments the utility data source 27 may include a utility meter 24 which provides access to utility data. The power line modem 54 of a monitoring device 60, 70, 80 couples to a conductor of the LV power line 62. In one embodiment, the LV power line 62 may couple to an overhead medium voltage ('MV') power line 64 through a distribution transformer 66. In another embodiment the LV power line 62 may couple to a MV underground residential distribution power line 67 through a pad mounted transformer. In this example embodiment, communications may be transmitted along the LV power line from the monitoring device 50, 70, or 80 to the power line modem 56 and communication interface 58 both of which may reside in the customer premises 63. The power line modem 56 for example, may be plugged into a wall socket on the premises. As is known in the art, typical voltage levels on the MV power lines 64, 67 range from about 1000 V to about 100 kV. Typical voltage levels on LV power lines 62 range from about 100 V to about 240 V. One skilled in the art will recognize that the architecture shown in FIG. 5 may be implemented wirelessly with an embodiment similar to that shown in FIG. 3.

Following are additional descriptions of the controller 22 and sensor 18, along with various automated utility data service methods.

Controller 22:

The controller 22 may include hardware and software for managing communications and control of the sensor 18, and in some embodiments, the utility meter 24. In some embodiments the utility meter 24 and or controller 22 may have an IP network address and be communicated with via an IP network 82 such as the Internet. For example, a utility management server 84 (see FIG. 5) may be coupled to the IP network 82, and may communicate with the controller 22 or utility meter 24. In some embodiments the utility management server 84 may send commands, such as a request for data and receive responses, including utility data that may include sampled measurements. For example, the utility management server 84 may request predictive maintenance data. The utility management server 84 may send commands at predetermined intervals to gather meter data, eliminating the need to have utility personnel physically travel to read the meter. Alternately, controller may transmit utility data periodically, intermittently or according to a schedule received from utility management server 84. Additionally, or instead, the meters may transmit real time utility usage data, which may be stored at the utility management server 84.

Further, a customer (or operator) may access a database (e.g., via the internet with a web browser) in (or connected to) the server 84 by logging in via a username to receive his or her real-time (e.g., within one minute, five minutes, fifteen minutes, thirty minutes, hour, or some other relatively short time period) power usage, which data may be processed by the server 84 to determine the customer's real-time pricing (RTP), critical peak pricing (CPP) and time-of-use (TOU) pricing. Alternatively, the customer may request utility information, which is then gathered in real time or near real time and routed to the customer at a user device 14 for display. Such utility data may be routed to the utility management server 84, and then routed to the user device 14. Alternatively, the utility management server 84 may send a command to the controller 22 including a destination address for routing specified or predetermined utility data. The controller then may respond by sampling the sensor data, formatting and packaging the data, and routing the data to the user device 14. The utility data may be routed to the user device 14 according to any of the embodiments described above, such as through a direct link to a telecommunication medium, through a cable box, through a combination of a wireless link and telecommunication link, or through a combination of a power line link and a telecommunication link. Thus, the address of each utility meter may be associated with a particular customer in memory to allow indexing, storage, and retrieval of the information in response to user requests and for other reasons. Additionally, numerous users may access the database at the same time to receive any or all of the above information.

The utility management server may gather utility data for various purposes. For example, data may be gathered to determine the total power being consumed along a network of customer premises, gathered data may be compared with the power being supplied to determine the efficiency of the network. In addition, one or more addressable switches, which may form part of a utility meter, may be controlled via the utility management server 84 (e.g., with commands transmitted to the controller 22) to permit connection and disconnection of gas, electricity, and/or water to the customer premises.

In one embodiment, the controller 22 may include an IDT 32334 RISC microprocessor for running embedded application software, along with flash memory for storing boot code, device data, configuration information (serial number, MAC addresses, subnet mask, and other information), application software, routing table(s), and statistical and measured data.

The controller 22 also may include random access memory (RAM), an Analog-to-Digital converter (ADC) and a "watchdog" timer. For example, RAM may be included for running the application software and for providing temporary storage of utility data and communication data packets. The ADC may capture various measurements of a sensor 18. The "watchdog" timer may be implemented to reset the controller 22 operations should a hardware glitch or software problem prevent proper operation to continue.

In addition to storing a real-time operating system, the memory of controller 22 also may include various program code sections such as a software upgrade handler, software upgrade processing software, and command handling and response processing. Code may be included for returning a status to a sender. In addition, other software may be included, such as ADC control software, power quality monitoring software, error detection software, network element provisioning software, and host configuration protocol (DHCP) software for registering a controller 22 or sensor 18 and software sufficient to collect and process raw measured data from a sensor to provide power usage data, water usage data, gas usage data, power line voltage data, power line current data, detection of a power outage, detection of water in a pad mount, detection of an open pad mount, detection of a street light failure, primary (medium voltage) line current data, power delivered to a transformer data, power factor data, power delivered to a downstream branch data, harmonic components of a power signal data, load transients data, and/or load distribution data.

In addition the controller 22 may also include an Ethernet adapter with an optional on-board MAC and physical (PHY) layer Ethernet chipset that can be used for converting peripheral component interconnect (PCI) to Ethernet signals for communicating with an Ethernet embodiment of the communication interface 20. In the utility data service system 40 described with regard to FIG. 3, the controller 22 may include an RJ45 connector to couple to a port for the wireless modem 44.

Sensor(s) 18:

The automated utility data service systems described above may include various sensors 18. Exemplary utility data sensors may include any one or more of, an optical meter reading sensor, a wired meter reading sensor, a power usage sensor, a water usage sensor, a gas usage sensor, a voltage sensor, a current sensor, and a power outage sensor. Additional sensor implementations are described below.

In an example embodiment, one or more electrical current sensors may be included, such as a magnetically permeable toroid with windings. For example, a monitoring device 60, 70, 80 as shown in FIG. 5 may include a current sensor. The current sensor may be coupled around an LV energized conductor 62 connected to a customer premises 63. In another example the current sensor may be connected to a medium voltage power line 64 in the vicinity of a distribution transformer 66, utility pole 68, or LV power line 62. In another embodiment the current sensor may be connected to an underground medium voltage power line 67. The winding of the current sensor may be connected to a resistor (which also is connected to ground) that is also connected an analog to digital converter ('ADC'), whose voltage may be periodically read by the controller 22. The current flowing to each customer premises (in each LV energized conductor) may be periodically measured. Such measured current may be processed, stored, and transmitted to a utility provider. By combining the current sensor with a voltage sensor, power consumption of a customer premises may be detected as well as power factor data. For example, a real-time power consumption data may be sent periodically and stored in memory of a utility management server 84 or another computer and be supplied to the user upon transmitting a request for power usage data, which may be supplied to the user along with the real-time consumption cost to the user (i.e., the user's utility bill to date). The data may also be processed by the controller 22 or an upstream utility management server 84 to provide customer load characteristics and patterns.

Other sensors 18 may include water/moisture sensors, temperature sensors, and/or light sensors. FIG. 5 shows a monitoring device 70 which may include a sensor 18 with controller 22 and communication interface 20 and be located at an underground transformer or pad transformer 72. Such sensor may be coupled to an underground MV URD power line 67. The device 70 may to detect moisture levels within the underground enclosure, or pad. A light sensor also may be included to detect when someone has opened a transformer enclosure, that the pad mount is open, or whether a hole has formed at the site enclosure.

In another embodiment, a level sensor may incorporated inside a distribution transformer housing (or attached to a transformer pad, utility pole or underground mount) that senses whether the sensor is level with ground (i.e., perpendicular to the pull of gravity). When the level sensor is installed so that it is level to the ground, the utility provider may detect when (or if) the pad, pole or other structure to which the sensor is mounted becomes tilted relative to the ground. The controller 22 may periodically poll the level sensor. Upon detection of a tilt via the level sensor, the controller 22 may transit an alarm to a utility management server 84, for example, which may automatically and electronically transmit a notification to the computer system of a power utility supplier in order to dispatch a repair or inspection crew.

In still another embodiment a monitoring device 80 may include a sensor 18 with controller 22 and communication interface 20 and be located at a street lamp 82 to detect failure of a street light 84. For example, the sensor may be a current sensor which detects light failure by detecting the absence of electrical current in the presence of light. Other sensors 18 that may be connected to the controller 22 may include a video sensor, a motion sensor, a vibration sensor, a wind speed and direction sensor, a thermometer and other sensors for monitoring the safety and security of utility service equipment. Such sensors may be at the utility pole, at a transformer, external and at the customer premises, and/or internal to the customer premises.

Utility Data Sampling:

Controller 22 may include Analog-to-digital 'ADC' Scheduler software to gather and process sensed utility data. The ADC Scheduler software may create a scheduling table in memory with entries for a given sensor according to default configurations, or according to commands received from a utility management server 84. The table may contain timer intervals, for example, for processing, recording, and reporting of utility data samples.

An ADC measurement task may wait on a timer (set by the ADC scheduler). When the timer expires the task may retrieve a new ADC sample(s). The raw sample(s) is converted into a measurement value. The measurement is given the timestamp of the last ADC sample used to make the measurement. The measurement may require further processing. If the measurement (or processed measurement) exceeds limit values, an alarm condition may be generated. Out of limit Alarms may be transmitted to the utility management server 84 and repeated at a report rate until the measurement is back within limits. An out of limit recovery Alert may be generated (and transmitted to the utility management server 84 when the out of limit condition is cleared (i.e., the measured value falls back within limit conditions).

The controller 22 may include value limits for sensor measurements that are stored in memory and compared to sensor samples. If a measurement is below a lower limit above an upper limit or otherwise out of an acceptable range, the controller 22 may transmit an Out-of-Limit Alarm, which is received and stored by the utility management server 84. In some instances, one or more measured values are processed to convert the measured value(s) to a standard or more conventional data value.

The measured data (or measured and processed data) may be stored in the memory of the controller 22. This memory area may include a circular buffer for each ADC measurement and time stamp. The buffers may be read by a utility management server 84 command processing task in response to a request for a measurement report. The measurement data may be backed up to flash memory by a flash store task.

Figures 6A, 6B, 6C:
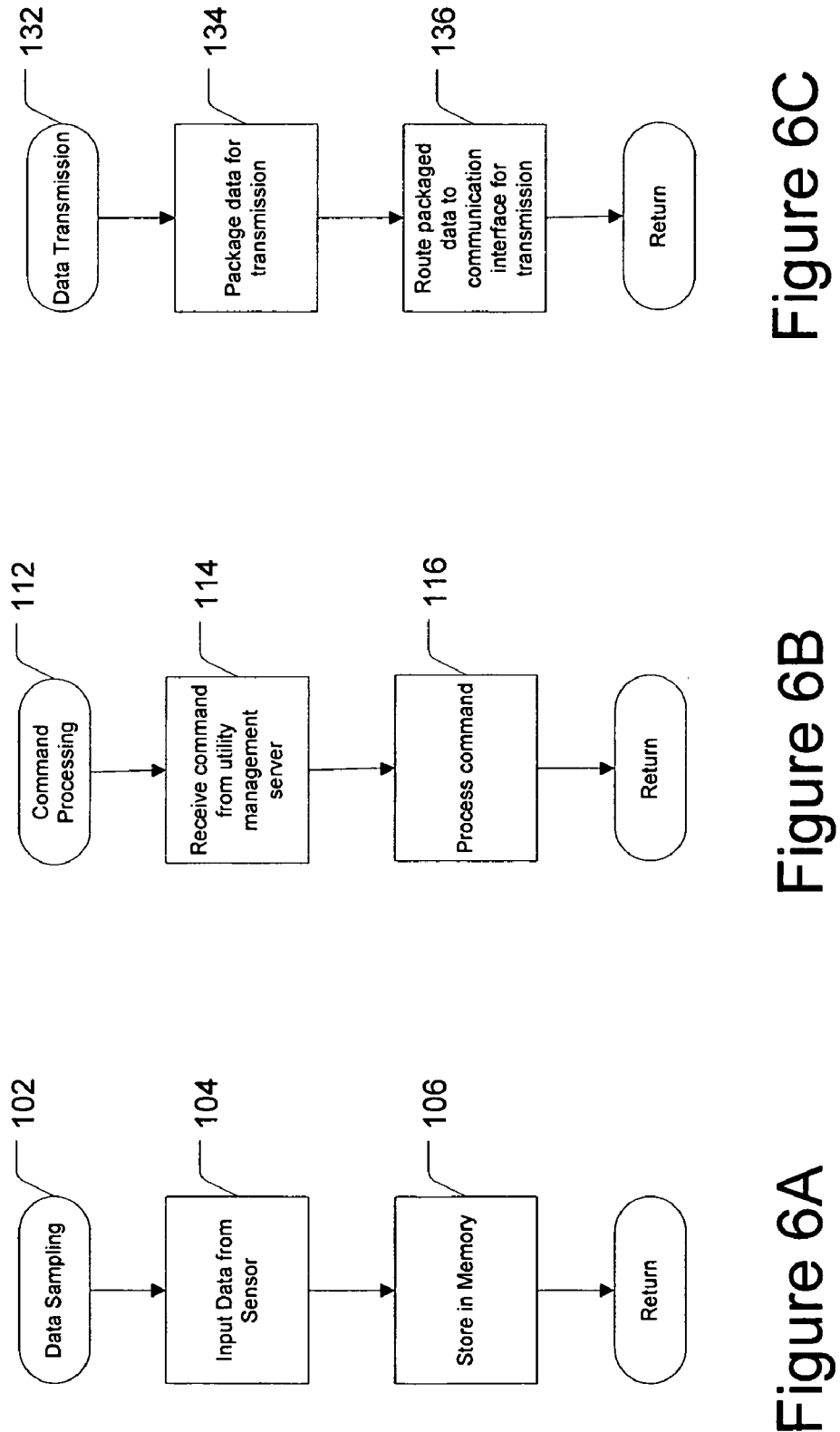
FIGS. 6A-C are flow charts of example embodiments of controller processes for implementing automated utility data services.

Controller Processes:

FIGS. 6A-6C show exemplary processes that may be executed by the controller 22, including a data sampling process 102, a command processing process 112, and a data transmission process 132. The data sampling process 102 may be executed periodically or in response to specific events, such as a command or reset operation. At step 104, the output of sensor 18 is sampled, and then stored in memory at step 106. The command processing process 112 may also be executed periodically or in response to a command received from the utility management server 84. For example, a set of commands may be queued by the process 112 periodically for other processes to carry out. In addition, upon receipt of a downstream communication from the utility management server 84 at step 114, the process 112 may unpackage the communication, parse a command(s), and sometime thereafter process the command(s) at step 116. Exemplary commands may include initiating gathering of a real time data sample, altering a utility data sampling schedule, triggering real time or near real time data flow to a user device, altering the controller configuration, altering the communication interface frequency, and routing a command to the utility meter 24. One skilled in the art will appreciate that other operations may be commanded to maintain sensor 18, controller 22, communication interface 20 and utility meter 24 operations. The data transmission process 132 also may be performed periodically or in response to an event, such as a command. At step 134 the controller 22 may package utility data, then at step 136 transmit the packaged data to the communication interface 20 for transmission.

As will be evident to one skilled in the art, the present invention thus may employ an existing telecommunications medium used to user services, such as provide cable television, broadband internet (such as a DSL twisted pair, a coaxial cable, fiber optic system), and/or telephone service, to provide automated utility data services. Further addition, a signal telecommunications medium, such as a fiber optic cable or coaxial cable, may be used to provide any combination of, or all of, said user services including telephony (e.g., VOIP), digital television, and broadband internet. The utility data, as a general matter, will be substantial less than the data associated with such user services and therefore is unlikely to have much detrimental impact to such user services.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. An automated utility data service system, comprising:
   a first device having a first device modem, said first device modem directly coupled to a telecommunication medium and directly connected to a consumer device;
   wherein said first device is configured to receive user data in a customer premises via the telecommunication medium from an external network and to provide the user data in demodulated form to the consumer device;
   wherein said first device is configured to facilitate communication of user data between the consumer device and the telecommunication medium;
   a second device having a first modem communicatively coupled to a sensor device configured to provide utility data;
   a third device comprising a second modem and a third modem;
   wherein said second modem of said third device is configured to communicate with said first modem of said second device to receive utility data therefrom; and
   wherein said third modem is configured to receive the utility data from said second modem and to transmit the utility data over the telecommunication medium to a remote computer system.

2. The system of claim 1, wherein said second modem is configured to communicate with the first modem via a communication medium comprising, at least in part, a wireless link.

3. The system of claim 1, wherein said second modem is configured to communicate with the first modem via a communication medium comprising, at least in part, a power line conductor.

4. The system of claim 1, wherein the utility data comprises power usage data.

5. The system of claim 4, wherein the user data comprises digital television data.

6. The system of claim 4, wherein the user data comprises broadband Internet data.

7. The system of claim 4, wherein the first device modem comprises a cable modem.

8. The system of claim 4, wherein the first device modem comprises a digital subscriber line (DSL) modem.

9. The system of claim 1, wherein the utility data comprises gas usage data.

10. The system of claim 1, wherein the utility data comprises water usage data.

11. The system of claim 1, wherein the user data comprises digital television data.

12. The system of claim 1, wherein the user data comprises voice over internet protocol (VoIP) data.

13. The system of claim 1, wherein the first device modem comprises a cable modem.

14. The system of claim 1, wherein the first device modem comprises a DSL modem.

15. The system of claim 1, wherein the first device modem comprises a fiber optic transceiver.

16. The system of claim 1, further comprising a router in communication with said first device modem.

17. The system of claim 1, wherein said sensor device is mounted on a utility pole.

18. The system of claim 1, wherein said utility data includes data for determining the power factor of a power line.

19. The system of claim 1, wherein the utility data comprises data indicative of a street light failure.

20. A method of using a telecommunication medium coupled to a customer premises to communicate utility data, comprising:
at a first device located within the customer premises:
receiving modulated first user data via the telecommunication medium;
demodulating the modulated first user data;
providing the first user data in demodulated form to a consumer device to which the first device is directly connected;
receiving second user data from the consumer device in demodulated form;
modulating the second user data; and
transmitting the modulated second user data over the telecommunication medium;
at a second device:
receiving utility data from a sensor device;
storing the utility data in memory;
receiving a command;
processing the command; and
transmitting the utility data to a third device;
receiving the utility data at the third device; and
with the third device, transmitting the received utility data over the telecommunication medium to a remote computer system.

21. The method of claim 20, wherein said command includes a request for utility data and said transmitting the utility data is performed in response to the request.

22. The method of claim 20, wherein said first user data is received via a data over cable service interface specification (DOCSIS) compatible protocol.

23. A method of using a telecommunication medium coupled to a customer premises to communicate utility data, comprising:
receiving, at a first device located within the customer premises, modulated first user data via the telecommunication medium;
demodulating the modulated first user data;
providing the demodulated first user data to a consumer device to which the first device is directly connected;
receiving second user data from the consumer device in demodulated form;
modulating the second user data;
transmitting, from the first device, the modulated second user data over the telecommunication medium;
receiving utility data from a utility meter with a second device;
transmitting the utility data to a third device;
receiving the utility data at the third device; and
with the third device, transmitting the received utility data over the telecommunication medium to a remote computer system.

24. The method of claim 23, further comprising:
receiving a request for utility data via the telecommunication medium; and
wherein said transmitting utility data is in response to receiving said request.

25. The method of claim 23, wherein the first user data comprises digital television data.

26. The method of claim 23, wherein the first user data comprises voice over internet protocol (VoIP) data.

27. The method of claim 23, wherein the first device includes a cable modem.

28. The method of claim 23, wherein the first device includes a DSL modem.

29. The method of claim 23, wherein the first device includes a fiber optic transceiver.

30. The method of claim 23, wherein said transmitting the utility data to the third device comprises wirelessly transmitting the utility data.

31. The method of claim 23, wherein said transmitting the utility data to the third device comprises transmitting the utility data over a power line.

32. The method of claim 23, wherein said transmitting the second user data and said transmitting utility data are performed via time division multiplexing.

33. The method of claim 23, wherein the first user data, the second user data, and the utility data are each included in one or more addressed Internet Protocol data packets.

34. The method of claim 20, wherein said transmitting the utility data to the third device comprises wirelessly transmitting the utility data.

35. The method of claim 20, wherein said transmitting the utility data to the third device comprises transmitting the utility data over a power line.

* * * * *

UNITED STATES PATENT AND TRADEMARK OFFICE
CERTIFICATE OF CORRECTION

PATENT NO. : 7,769,149 B2 Page 1 of 1
APPLICATION NO. : 11/327340
DATED : August 3, 2010
INVENTOR(S) : William H. Berkman It is certified that error appears in the above-identified patent and that said Letters Patent is hereby corrected as shown below:

In column 11, line 51, in claim 20, after "command;" delete "and".

Signed and Sealed this

Ninth Day of November, 2010

David J. Kappos
*Director of the United States Patent and Trademark Office*